United States Patent
El Hassan et al.

(10) Patent No.: US 11,713,279 B1
(45) Date of Patent: Aug. 1, 2023

(54) DECARBONIZATION OF CONCRETE THROUGH CEMENT REPLACEMENT OF CALCIUM CARBIDE RESIDUE AND ACCELERATED CARBONATION CURING

(71) Applicant: United Arab Emirates University, Al Ain (AE)

(72) Inventors: Hilal El Hassan, Al Ain (AE); Jad Bawab, Al Ain (AE); Jamal Khatib, Al Ain (AE); Amr El Dieb, Al Ain (AE); Ashraf Aly Hassan, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/104,602

(22) Filed: Feb. 1, 2023

(51) Int. Cl.
 *C04B 28/04* (2006.01)
 *B28B 11/24* (2006.01)
 *C04B 40/02* (2006.01)

(52) U.S. Cl.
 CPC ............ *C04B 28/04* (2013.01); *B28B 11/245* (2013.01); *C04B 40/0231* (2013.01); *C04B 2201/52* (2013.01)

(58) Field of Classification Search
 CPC ....... C04B 14/22; C04B 7/4453; C04B 14/30; C04B 20/0036; C04B 20/026; C04B 20/04; C04B 35/62665; C04B 7/43; C04B 7/44; C04B 2103/0042; C04B 2111/00327; C04B 2235/528; B05B 7/20; B22F 3/003; C03B 5/00; C03B 19/10; F27B 15/00; F27B 15/10; F27B 15/14; F27B 15/003; Y02P 40/121
 See application file for complete search history.

(56) References Cited

U.S. PATENT DOCUMENTS

2015/0307400 A1 10/2015 Devenney et al.
2021/0262320 A1 8/2021 Nguyen et al.

OTHER PUBLICATIONS

Hanjitsuwan et al "Comparative study using Portland cement and calcium carbide residue as a promoter in bottom ash geopolymer mortar", Construction and Building Materials, vol. 133, Feb. 15, 2017, pp. 128-134. (Year: 2017).*
Andrade, C., & Sanjuan, M. Á., "Carbon dioxide uptake by pure Portland and blended cement pastes", ELSEVIER, Developments in the Built Environment, 2021, vol. 8, Issue 100063, 11 pages.
Aparicio et al., "Behaviour of concrete and cement in carbon dioxide sequestration by mineral carbonation processes", Boletín de la Sociedad Española de Cerámica y Vidrio, 2022, vol. 61, pp. 220-228, 9 pages.
El-Hassan, H., & Shao, Y., "Dynamic carbonation curing of fresh lightweight concrete", ice Institution of Civil Engineers Publishing, Magazine of concrete research, 2014, vol. 66, Issue 14, pp. 708-718, 12 pages.

El-Hassan, H., & Shao, Y., "Early carbonation curing of concrete masonry units with Portland limestone cement", ELSEVIER, Cement and Concrete Composites, 2015, vol. 62, pp. 168-177, 10 pages.
El-Hassan et al., "Effect of Initial Curing on Carbonation of Lightweight Concrete Masonry Units", ACI Materials Journal, 2013, vol. 110, Issue 4, 11 pages.
El-Hassan et al., "Reaction products in carbonation-cured lightweight concrete", Journal of materials in civil engineering, 2013, vol. 25, Issue 6, pp. 799-809, 11 pages.
Hameed et al., "CO2 uptake and physicochemical properties of carbonation-cured ternary blend Portland cement-metakaolin-limestone pastes", Materials, 2020, vol. 13, Issue 4656, 14 pages.
Karnal et al., "Carbon dioxide sequestration in concrete and its effects on concrete compressive strength", ELSEVIER, Materials Today: Proceedings, 2020, vol. 31, pp. A18-A21, 4 pages.
Li, L., & Wu, M., "An overview of utilizing CO2 for accelerated carbonation treatment in the concrete industry", ELSEVIER, Journal of CO2 Utilization, 2022, vol. 60, Issue 102000, 17 pages.
Park, B., & Choi, Y. C., "Effect of Carbonation Curing on Physical and Durability Properties of Cementitious Materials Containing AOD Slag", Applied Sciences, 2020, vol. 10, Issue 6646, 17 pages.
Phung et al., "Effect of limestone fillers on microstructure and permeability due to carbonation of cement pastes under controlled CO2 pressure conditions", ELSEVIER, ScienceDirect, Construction and Building Materials, 2015, vol. 32, pp. 376-390, 15 pages.
Possan et al., "CO2 uptake potential due to concrete carbonation: a case study", ELSEVIER, ScienceDirect, Case Studies in Construction Materials, 2017, vol. 6, pp. 147-161, 15 pages.
Qin et al., "Influence of mineral admixtures on carbonation curing of cement paste", ELSEVIER, ScienceDirect, Construction and Building Materials, 2019, vol. 212, pp. 653-662, 10 pages.
Seo et al., "CO2 uptake of carbonation-cured cement blended with ground volcanic ash", Materials, 2018, vol. 11, Issue 2187, 13 pages.
Shao, Y., & El-Hassan, H., "CO2 utilization in concrete", In Third International Conference on Sustainable Construction Materials and Technologies (SCMT3), 2013, 8 pages.
Sharma, D., & Goyal, S., "Effect of accelerated carbonation curing on near surface properties of concrete", European Journal of Environmental and Civil Engineering, 2022, vol. 26, Issue 4, pp. 1300-1321, 23 pages.

(Continued)

*Primary Examiner* — Anthony J Green
(74) *Attorney, Agent, or Firm* — Hayes Soloway PC

(57) ABSTRACT

A system and a method for concrete production is disclosed. In some implementations, the method comprises the steps of mixing of a calcium carbide residue (CCR) and ordinary Portland cement (OPC) to produce a CCR-OPC blended concrete, incorporating the CCR-OPC blended concrete in its fresh or hardened state to a carbonation chamber for accelerated carbonation curing, and producing a carbonated CCR-OPC blended concrete after the accelerated carbonation curing. The CCR-OPC blended concrete is exposed to a carbon dioxide ($CO_2$) gas to promote a plurality of properties. The system includes a blending module and a carbonation chamber. The blending module mixes CCR and OPC to produce a CCR-OPC blended concrete, and the carbonation chamber performs accelerated carbonation curing of the CCR-OPC blended concrete in its fresh or semi-hardened state to produce a carbonated CCR-OPC blended concrete.

17 Claims, 5 Drawing Sheets

(56) References Cited

OTHER PUBLICATIONS

Shi et al., "Accelerated carbonation as a fast-curing technology for concrete blocks", Sustainable and nonconventional construction materials using inorganic bonded fiber composites, ELSEVIER, 2017, pp. 313-341, 29 pages.

Suescum-Morales et al., "Accelerated carbonation of fresh cement-based products containing recycled masonry aggregates for CO2 sequestration", ELSEVIER, ScienceDirect, Journal of CO2 Utilization, 2021, vol. 46, Issue 101461, 21 pages.

Wang et al., "Strategies to accelerate CO2 sequestration of cement-based materials and their application prospects", ELSEVIER, ScienceDirect, Construction and Building Materials, 2022, vol. 314, Issue 125646, 18 pages.

Wang et al., "CO2 Curing on the Mechanical Properties of Portland Cement Concrete", Buildings, 2022, vol. 12, Issue 817, 17 pages.

Winnefeld et al., "CO2 storage in cement and concrete by mineral carbonation", ELSEVIER, ScienceDirect, Current Opinion in Green and Sustainable Chemistry, 2022, vol. 38, Issue 100672, 8 pages.

Xu et al., "Effects of temperature, humidity and CO2 concentration on carbonation of cement-based materials: a review", ELSEVIER, ScienceDirect, Construction and Building Materials, 2022, vol. 346, Issue 128399, 15 pages.

Xuan et al., "Development of a new generation of eco-friendly concrete blocks by accelerated mineral carbonation", ELSEVIER, ScienceDirect, Journal of Cleaner Production, 2016, vol. 133, pp. 1235-1241, 7 pages.

Youn et al., "Carbon dioxide sequestration process for the cement industry", ELSEVIER, ScienceDirect, Journal of CO2 Utilization, 2019, vol. 34, pp. 325-334, 10 pages.

Zhang et al., "Carbonation curing of precast fly ash concrete", Journal of Materials in Civil Engineering, 2016, vol. 28, Issue 11, 10 pages.

* cited by examiner

| Mix ID | Group | Mix Designation | Initial air curing Duration (h) | Carbonation Duration (h) | CCR (%) |
|---|---|---|---|---|---|
| 1 | 0a-0c | 0a-0c-0CCR | 0 | 0 | 0 |
| 2 | | 0a-0c-5CCR | 0 | 0 | 5 |
| 3 | | 0a-0c-10CCR | 0 | 0 | 10 |
| 4 | 0a-4c | 0a-4c-0CCR | 0 | 4 | 0 |
| 5 | | 0a-4c-5CCR | 0 | 4 | 5 |
| 6 | | 0a-4c-10CCR | 0 | 4 | 10 |
| 7 | 0a-20c | 0a-20c-0CCR | 0 | 20 | 0 |
| 8 | | 0a-20c-5CCR | 0 | 20 | 5 |
| 9 | | 0a-20c-10CCR | 0 | 20 | 10 |
| 10 | | 0a-20c-20CCR | 0 | 20 | 20 |
| 11 | 4a-4c | 4a-4c-0CCR | 4 | 4 | 0 |
| 12 | | 4a-4c-5CCR | 4 | 4 | 5 |
| 13 | | 4a-4c-10CCR | 4 | 4 | 10 |
| 14 | 20a-4c | 20a-4c-0CCR | 20 | 4 | 0 |
| 15 | | 20a-4c-5CCR | 20 | 4 | 5 |
| 16 | | 20a-4c-10CCR | 20 | 4 | 10 |
| 17 | 20a-20c | 20a-20c-0CCR | 20 | 20 | 0 |
| 18 | | 20a-20c-5CCR | 20 | 20 | 5 |
| 19 | | 20a-20c-10CCR | 20 | 20 | 10 |
| 20 | | 20a-20c-20CCR | 20 | 20 | 20 |

DECARBONIZATION OF CONCRETE THROUGH CEMENT REPLACEMENT OF CALCIUM CARBIDE RESIDUE AND ACCELERATED CARBONATION CURING

FIELD OF THE INVENTION

Embodiments of the present invention relate to the field of a decarbonization of concrete and more particularly, to a system and a method for a concrete production used in precast construction to mitigate the adverse environmental impact of carbon emissions.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

Concrete production is a significant contributor to global $CO_2$ emissions. Indeed, around 8% of the total global $CO_2$ emissions are linked to the production and use of concrete. This is mainly due to the significant carbon emissions that originate from the production of cement. Additionally, the demand for concrete in the construction industry is ever-increasing to meet the increasing need for a new infrastructure.

According to the research, the yearly production of concrete is approximately 14 billion $m^3$ and is anticipated to exceed 20 billion $m^3$ by 2050. This has driven the industry to find more environment-friendly alternatives or develop novel mechanisms to reduce its carbon footprint. Many systems and methods are available to decarbonize the concrete by using an accelerated carbonation curing that provided a promising result. In one method, a fresh or semi-hardened concrete (i.e., within 24 hours of casting) undergoes a carbonation reaction in a controlled environment. Carbonation is an accelerated hydration reaction between calcium-carrying compounds, mainly calcium silicates, in cement and $CO_2$ gas, in the presence of water to form calcium carbonate ($CaCO_3$) and calcium silicate hydrate (C—S—H) gel. Thus, concrete is transformed into a carbon sink.

However, the accelerated carbonation curing is limited to precast concrete applications, such as concrete blocks (masonry units) and bricks. The extent of carbonation or $CO_2$ absorption depends on several factors, including the water content in the concrete, $CO_2$ concentration and pressure, concrete mixture proportions, and duration of carbonation ($CO_2$ exposure).

Previous systems and methods have maximized the carbon sequestration potential of cement-based concrete by optimizing the process parameters. Yet, the concrete mixture proportions require further inventions, as different calcium-rich materials may enhance the carbonation reaction efficiency and increase the $CO_2$ absorption.

Another example is US20150307400A1 discloses a methods and systems for utilizing carbide lime or slag. The method comprising: a) treating a slag solid or carbide lime suspension with an ammonium salt in water to produce an aqueous solution comprising calcium salt, ammonium salt, and solids; b) contacting the aqueous solution with carbon dioxide from an industrial process under one or more precipitation conditions to produce a precipitation material comprising calcium carbonate and a supernatant aqueous solution wherein the precipitation material and the supernatant aqueous solution comprise residual ammonium salt; and c) removing and optionally recovering ammonia and/or ammonium salt using one or more steps of: (i) recovering a gas exhaust stream comprising ammonia during the treating and/or the contacting step; (ii) recovering the residual ammonium salt from the supernatant aqueous solution; and (iii) removing and optionally recovering the residual ammonium salt from the precipitation material.

But the above-disclosed patent has some disadvantages. The above preparation method discloses the use of a calcium carbide residue (CCR) for several purposes, including $CO_2$ sequestration. The prior art states that the CCR is solely exposed to carbonation and the generated product is a precipitate calcium carbonate (PCC) that can be employed in several applications, including building materials. But the above patent doesn't disclose the use of the CCR as a replacement of an OPC within the CCR-OPC blended concrete.

Another example is US20210262320A1 discloses a geomass mediated carbon sequestration material production methods and systems for practicing the same. Aspects of the methods include contacting a gaseous source of $CO_2$ and an aqueous capture ammonia to produce a $CO_2$ sequestering product and an aqueous ammonium salt, and then contacting the aqueous ammonium salt liquid with a geomass, e.g., alkaline waste product, to regenerate the aqueous capture ammonia. Also provided are systems configured for carrying out the methods.

The above method discloses a method to sequester $CO_2$ gas using aqueous capture ammonia, where a $CO_2$ storage product and ammonium salt liquid are produced. Consequently, an alkaline waste is used with the ammonium salt liquid to regenerate aqueous capture ammonia. But the above method does not disclose the use of a calcium carbide residue (CCR) as an OPC replacement to produce a CCR-OPC blended concrete. Further, the above method does not disclose an exposure of the CCR-OPC blended concrete in its fresh or semi-hardened state to an accelerated carbonation curing for $CO_2$ sequestering.

However, no patent discloses the method of replacing the OPC with the CCR to produce a carbonated CCR-OPC blended concrete by exposing a CCR-OPC blended concrete in its fresh or semi-hardened state to carbon dioxide ($CO_2$) gas. It helps in promoting a rapid strength gain, an enhanced durability, and a permanent sequester of the carbon dioxide gas from the carbonated CCR-OPC blended concrete.

In order to overcome the aforementioned drawbacks, there is a need to develop a novel system and a method for a concrete production to decarbonize a carbonated CCR-OPC blended concrete. Further, the incorporation of the CCR promotes a higher degree of an accelerated carbonation curing wherein the compressive strength and volume of permeable voids are enhanced by the replacement of the OPC with the CCR, increasing the initial air curing duration, and increasing the accelerated carbonation duration.

SUMMARY OF THE INVENTION

An embodiment of the present disclosure relates to a method for a concrete production. In one general aspect, the method may include multiple steps. In the first step, a calcium carbide residue (CCR) is mixed with an ordinary Portland cement (OPC) to produce a CCR-OPC blended concrete. In the next step, the CCR-OPC blended concrete in its fresh or semi-hardened state is incorporated to a carbonation chamber for an accelerated carbonation curing. In the last step, a carbonated CCR-OPC blended concrete is produced after the accelerated carbonation curing. Other embodiments of this aspect include corresponding architecture, apparatus, and computer programs recorded on one or more storage devices, each configured to perform the actions of the methods.

In accordance with an embodiment of the present invention, the CCR-OPC blended concrete in its fresh or semi-hardened state is exposed to a carbon dioxide ($CO_2$) gas to promote a plurality of properties of the carbonated CCR-OPC blended concrete. Further, the plurality of properties of the carbonated CCR-OPC blended concrete is a rapid strength gain, an enhanced durability, and a permanent sequester of the carbon dioxide gas.

In accordance with an embodiment of the present invention, the CCR is an industrial waste by product and is mainly composed of a calcium hydroxide $Ca(OH)_2$. Other synonyms of CCR include carbide slag, carbide lime, carbide sludge, acetylene sludge, lime sludge, lime slurry, carbide slurry etc. All such synonyms fall within the scope of the invention.

In accordance with an embodiment of the present invention, the ordinary Portland cement (OPC) is replaced by up to 20% of the calcium carbide residue (CCR), by mass.

In accordance with an embodiment of the present invention, the carbonated CCR-OPC blended concrete is obtained by mixing of a cementitious binder, an aggregate, and water. Further, the calcium carbide residue incorporation reduced an overall carbon footprint of the carbonated CCR-OPC blended concrete.

In accordance with an embodiment of the present invention, the accelerated carbonation curing of the CCR-OPC blended concrete is affected by a quantity of the CCR, an initial air curing duration, and an accelerated carbonation curing duration.

In accordance with an embodiment of the present invention, the incorporation of the CCR and the accelerated carbonation curing affect the performance of the carbonated CCR-OPC blended concrete that is evaluated through $CO_2$ uptake, a compressive strength, and a volume of permeable voids.

In accordance with an embodiment of the present invention, the $CO_2$ uptake is increased by replacing the OPC with the CCR, extending the accelerated carbonation curing duration and prolonging the initial air curing duration of the semi-hardened CCR-OPC blended concrete.

In accordance with an embodiment of the present invention, the compressive strength and the volume of permeable voids of the carbonated CCR-OPC blended concrete are enhanced by replacing the OPC with the CCR, prolonging the accelerated carbonation curing duration, and increasing the initial air curing duration.

In one general aspect, a system for a concrete production is disclosed. The system includes a blending module, and a carbonation chamber. The blending module mixes a calcium carbide residue (CCR) and an ordinary Portland cement (OPC) to produce a CCR-OPC blended concrete. The carbonation chamber performs an accelerated carbonation curing of the CCR-OPC blended concrete in its fresh or semi-hardened state. Further, the carbonation chamber produces a carbonated CCR-OPC blended concrete after the accelerated carbonation curing.

In accordance with an embodiment of the present invention, the CCR-OPC blended concrete c is exposed to a carbon dioxide ($CO_2$) gas to promote a plurality of properties of the carbonated CCR-OPC blended concrete. Further, the plurality of properties of the carbonated CCR-OPC blended concrete is a rapid strength gain, an enhanced durability, and a permanent sequester of the carbon dioxide gas.

In accordance with an embodiment of the present invention, the CCR is an industrial waste by product and is mainly composed of a calcium hydroxide $Ca(OH)_2$. Other synonyms of CCR include carbide slag, carbide lime, carbide sludge, acetylene sludge, lime sludge, lime slurry, carbide slurry etc. All such synonyms fall within the scope of the invention.

In accordance with an embodiment of the present invention, the ordinary Portland cement (OPC) is replaced by up to 20% of the calcium carbide residue, by mass.

In accordance with an embodiment of the present invention, the carbonated CCR-OPC blended concrete is obtained by mixing of a cementitious binder, an aggregate, and water. Further, the calcium carbide residue incorporation reduced an overall carbon footprint of the carbonated CCR-OPC blended concrete.

In accordance with an embodiment of the present invention, the accelerated carbonation curing of the CCR-OPC blended concrete is affected by a quantity of the CCR, an initial air curing duration, and an accelerated carbonation curing duration.

In accordance with an embodiment of the present invention, the incorporation of the CCR and the accelerated carbonation curing affect the performance of the carbonated CCR-OPC blended concrete that is evaluated through $CO_2$ uptake, a compressive strength, and a volume of permeable voids.

In accordance with an embodiment of the present invention, the $CO_2$ uptake is increased by replacing the OPC with the CCR, extending the accelerated carbonation curing duration and prolonging the initial air curing duration of the semi-hardened CCR-OPC blended concrete.

In accordance with an embodiment of the present invention, the compressive strength and the volume of permeable voids of the carbonated CCR-OPC blended concrete are enhanced by replacing the OPC with the CCR, prolonging the accelerated carbonation curing duration, and increasing the initial air curing duration.

The foregoing objectives of the present invention is to reduce the carbon footprint of the concrete production by partial replacement of ordinary Portland cement (OPC) with an industrial waste by-product calcium carbide residue (CCR) and exposing the OPC-CCR blended concrete in its fresh or semi-hardened state to accelerated carbonation for $CO_2$ sequestration. The benefit of the invention also includes the recycling the CCR in the carbonated CCR-OPC blended concrete rather than disposing of the CCR in landfills and stockpiles.

BRIEF DESCRIPTION OF THE DRAWINGS

So that the manner in which the above recited features of the present invention are understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

Figure 1:
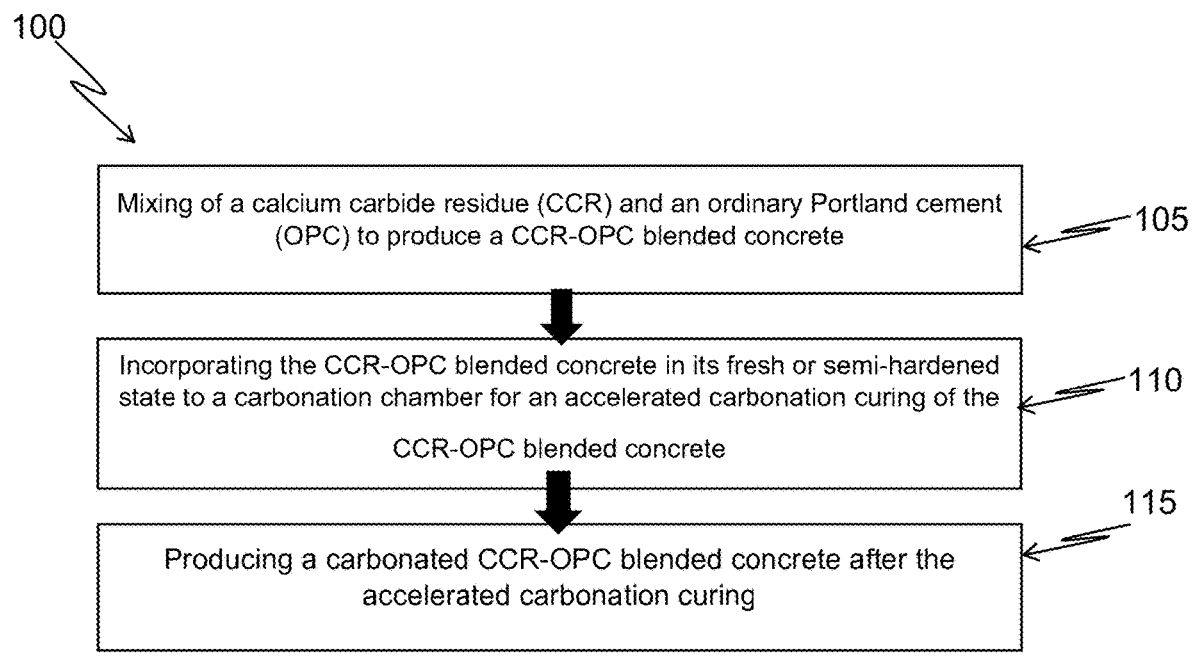
FIG. 1 is a block diagram illustrating a method for a concrete production, according to an embodiment of the present invention.

Carbonation chamber 302
Safety valve 304
Pressure regulators 306
$CO_2$ cylinder 308
Lime water 310
Valve 312
A plurality of concrete samples 314
Blending module 902

DETAILED DESCRIPTION OF THE DRAWINGS

The present invention relates to a system and a method for a cement production for reducing an overall carbon footprint of the carbonated CCR-OPC blended concrete. Further, the CCR incorporation in the carbonated CCR-OPC blended concrete enhances its carbon sequestration potential, as CCR is rich in calcium hydroxide [$Ca(OH)_2$], promotes the concept of carbon capture, utilization, and storage (CCUS), improves the mechanical and durability properties of the carbonated CCR-OPC blended concrete.

The principles of the present invention and their advantages are best understood by referring to FIG. 1 to FIG. 9. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

In accordance with the present invention, decarbonization of concrete and reduction in its carbon footprint is two-fold. On one hand, cement is partially replaced with CCR, which has no carbon footprint (i.e., zero $CO_2$ emissions). On the other hand, incorporating CCR in concrete enhances its carbon sequestration potential, as CCR is rich in calcium hydroxide $Ca(OH)_2$ while positively impacting its performance. Accordingly, the present invention promotes the concept of carbon capture, utilization, and storage (CCUS), decarbonizes concrete, and improves its mechanical and durability properties.

This invention relates to a method to reduce the carbon footprint of concrete production by using an industrial waste by-product calcium carbide residue (CCR), as a partial replacement for ordinary Portland cement (OPC), wherein the concrete is made of a cementitious binder, aggregates, and water. Cement is replaced by up to 20% calcium carbide residue, by mass. The produced CCR-OPC blended concrete is exposed to accelerated carbonation curing in a controlled environment. The accelerated carbonation curing regime is a process in which concrete is exposed to carbon dioxide gas at an early age (within 24 hours) to promote rapid strength gain, enhance durability, and permanently sequesters the carbon dioxide gas in concrete. The accelerated carbonation curing process for CCR-OPC blended concrete is affected by the quantity of CCR, initial air curing duration, and accelerated carbonation curing duration. Calcium carbide residue incorporation promotes a higher degree of carbonation wherein the compressive strength and volume of permeable voids are enhanced by the replacement of cement by calcium carbide residue, increasing the initial air curing duration, and prolonging the carbonation duration.

FIG. 1 is a block diagram illustrating a method 100 for a concrete production, according to an embodiment of the present invention. The methods include a calcium carbide residue (CCR), an ordinary Portland cement (OPC), a CCR-OPC (calcium carbide residue-ordinary Portland cement) blended concrete, a carbonation chamber 302 (Refer to FIG. 3).

In accordance with an embodiment of the present invention, the calcium carbide residue (CCR) is mixed with the ordinary Portland cement (OPC) to produce the CCR-OPC blended concrete, as shown in step 105. Further, the CCR in a solid powder form is incorporated as a replacement of the OPC. Further, the CCR-OPC blended concrete in its fresh or semi-hardened state is incorporated to the carbonation chamber 302 (Refer to FIG. 3) for an accelerated carbonation curing of the CCR-OPC blended concrete, as shown in step 110. In the last step, a carbonated CCR-OPC blended concrete is produced after the accelerated carbonation curing, as shown in 115. In accordance with an embodiment of the present invention, the CCR-OPC blended concrete is exposed to a carbon dioxide ($CO_2$) gas to promote a plurality of properties of the carbonated CCR-OPC blended concrete. Further, the plurality of properties of the carbonated CCR-OPC blended concrete is a rapid strength gain, an enhanced durability, and a permanent sequester of the carbon dioxide gas.

In accordance with an embodiment of the present invention, the Calcium carbide residue (CCR) is an industrial waste by product of the acetylene gas industry. It is mainly composed of calcium hydroxide $Ca(OH)_2$, which readily reacts with the $CO_2$ gas in the presence of water. Unlike the analytical grade, calcium hydroxide, the CCR is an industrial waste by-product, not pure $Ca(OH)_2$.

In accordance with an embodiment of the present invention, the ordinary Portland cement (OPC) is replaced by up to 20% of the calcium carbide residue, by mass. In accordance with an embodiment of the present invention, the carbonated CCR-OPC blended concrete is obtained by mixing of a cementitious binder, an aggregate, and water. Further, the calcium carbide residue incorporation reduced an overall carbon footprint of the carbonated CCR-OPC blended concrete.

In accordance with an embodiment of the present invention, the accelerated carbonation curing of the CCR-OPC blended concrete is affected by a quantity of the CCR, an initial air curing duration, and an accelerated carbonation curing duration.

In accordance with an embodiment of the present invention, the incorporation of the CCR and the accelerated carbonation curing affect the performance of the carbonated CCR-OPC blended concrete that is evaluated through a $CO_2$ uptake, a compressive strength, and a volume of permeable voids.

In accordance with an embodiment of the present invention, the $CO_2$ absorption is increased by extending the accelerated carbonation curing duration and prolonging the initial air curing duration of the CCR-OPC blended concrete. In accordance with an embodiment of the present invention, the compressive strength and the volume of permeable voids of the carbonated CCR-OPC blended concrete are enhanced by replacing the OPC with the CCR, prolonging the accelerated carbonation curing duration, and increasing the initial air curing duration.

Figures 2, 3:
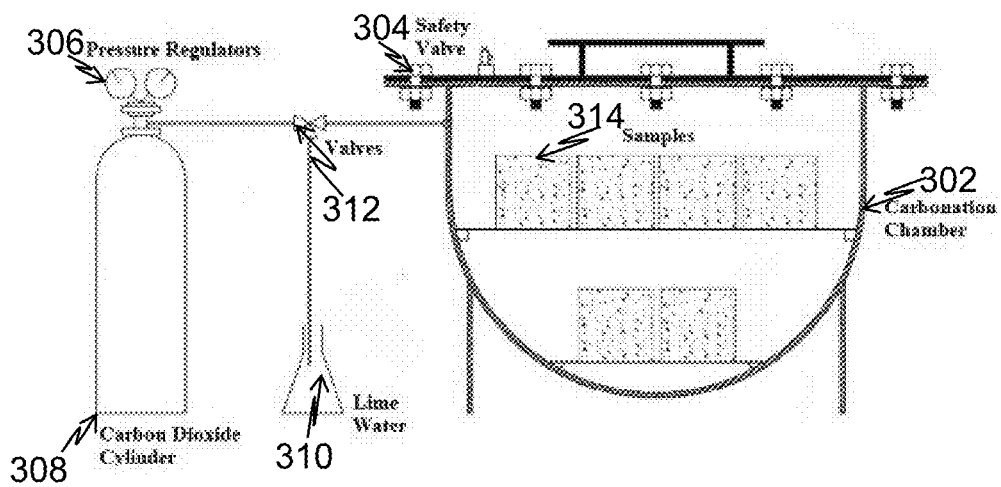
FIG. 2 illustrates a table of a test matrix, according to an exemplary embodiment of the present invention.
FIG. 3 illustrates a schematic of an accelerated carbonation curing process, according to an exemplary embodiment of the present invention.

FIG. 2 illustrates a table of a test matrix, according to an exemplary embodiment of the present invention. Several process parameters affect the efficiency of the accelerated carbonation curing of the CCR-OPC blended concrete, i.e., $CO_2$ uptake, such as the initial air curing duration, the accelerated carbonation curing carbonation duration, the OPC mass replacement percentage by CCR, and the carbonated CCR-OPC blended concrete mix design.

The mixing is grouped by the adopted accelerated carbonation curing process. In each group, one mix is made without CCR and served as a reference. Also, group 0a-0c is a benchmark group that does not undergo the accelerated carbonation curing and experienced a typical hydration reaction. The mixes are designated as Xa-Yc-Z CCR, where X represents the duration of initial air curing, Y denotes the duration of the accelerated carbonation curing, and Z is the OPC mass replacement percentage by the CCR. For instance, 20a-20c-5CCR entails a mix comprising 5% CCR replacement, by the OPC mass, and exposed to 20 hours of the initial air curing followed by 20 hours of the accelerated carbonation curing.

The test matrix is designed to show the effect of the initial air curing duration, the accelerated carbonation curing duration, and the CCR replacement percentage on the performance of the carbonated CCR-OPC blended concrete. In fact, the effect of the initial air curing duration is evaluated by comparing groups (1) 0a-4c, 4a-4c, and 20a-4c or (2) 0a-20c and 20a-20c. Meanwhile, to evaluate the influence of the accelerated carbonation curing duration, groups (1) 0a-0c, 0a-4c, and 0a-20c or (2) 20a-4c and 20a-20c are compared. Within each group, the CCR replacement percentage is varied by up to 10%, by the OPC mass, except in groups subjected to 20 hours of the accelerated carbonation curing (0a-20c and 20a-20c), where the CCR replacement percentage reached 20%, by the OPC mass.

In accordance with an embodiment of the present invention, the components of the carbonated CCR-OPC blended concrete mixes included ASTM (American Society for Testing and Materials) type I ordinary Portland cement (OPC), crushed limestone aggregates, tap water, and the CCR. The CCR is obtained in a slurry form. Prior to inclusion in the mix, it is dried and sieved through an ASTM #325 sieve (nominal particle size of 45 microns). Concrete mixes are designed, and it is based on the mixture proportions for a local CCR-OPC blended concrete blocks and bricks. A water-to-binder ratio (w/b) of 0.55 and a binder-to-aggregate ratio of 1:6 is selected for this process. The concrete mixtures included 0, 5, 10, or 20% CCR replacement, by the OPC mass.

The dry ingredients are first mixed in a pan mixer for 2 minutes, followed by the gradual addition of water and further mixing for another 3 minutes Immediately after mixing, the fresh concrete is cast into 100-mm cubes and 100×200 mm (diameter×height) cylinders, vibrated on a vibration table for 10 seconds, and demolded. The demolded specimens are initially air cured in ambient conditions [relative humidity (RH) of 50±5% and temperature of 25±2° C.] and then carbonated for specific durations, as per shown in the test matrix of Table 1 (Refer to FIG. 2). The control group 0a-0c is placed in a sealed plastic bag until testing.

FIG. 3 illustrates a schematic of the accelerated carbonation curing, according to an exemplary embodiment of the present invention. The accelerated carbonation curing is carried out in a sealable carbonation chamber 302 equipped with a safety valve 304. The carbonation chamber 302 is attached to a $CO_2$ cylinder 308 with a purity of at least 95%. The $CO_2$ cylinder 308 is equipped with a pressure regulator 306. The $CO_2$ cylinder 308 and the carbonation chamber 302 is attached with a valve 312 that is further attached with a beaker. The beaker is filled with a lime water 310. Further, the pressure is set to 1 bar for all mixes. The temperature and relative humidity are not controlled and are in the ranges of 20-40° C. and 20-90%, respectively.

The fluctuations in these two parameters are due to the exothermic nature of the accelerated carbonation curing reaction, which released heat and water from a plurality of concrete samples 314 into the sealed carbonation chamber 302. After the accelerated carbonation curing, the plurality of concrete sample 314 is sealed in a 12-plastic bag. There, they are sprayed with water regularly, i.e., every day for the first 7 days and every other day until the testing day, to compensate for the water lost during the air and the accelerated carbonation curing and promote a subsequent hydration reaction. In accordance with an embodiment of the present invention, the effect of the CCR replacement and the accelerated carbonation curing on the performance of the carbonated CCR-OPC blended concrete is evaluated through the $CO_2$ uptake, compressive strength, and volume of permeable voids. The $CO_2$ uptake is determined by using a mass gain method as shown in equation 1. It is the change in the mass of a sample due to the accelerated carbonation curing while accounting for the water loss divided by the mass of cement (OPC).

$$CO_2 \text{ uptake} = [(\text{Final mass} - \text{Initial mass} + \text{Water mass})/\text{Cement mass}] \times 100\% \quad (1)$$

The compressive strength test of concrete is performed after 28 days of the accelerated carbonation curing, as per BS EN-12390-3. The BS EN-12390-3 specifies a method for the determination of the compressive strength of test specimens of the CCR-OPC blended concrete. The average of three samples is considered. The volume of permeable voids test is also carried out at 28 days of age following ASTM C642. ASTM C642 is a standard test method for determinations of density, percent absorption, and percent voids in the CCR-OPC blended concrete.

Figure 4:
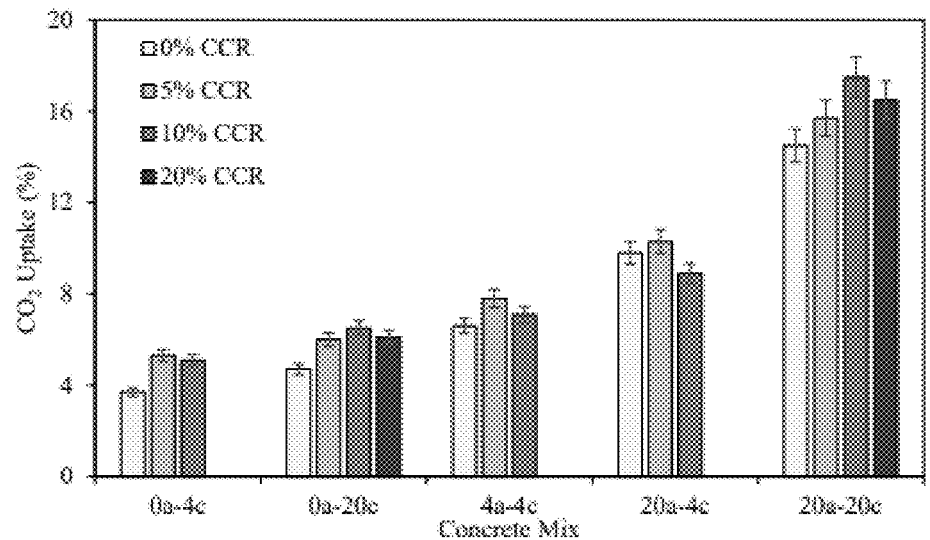
FIG. 4 is a graph that illustrates a $CO_2$ uptake result, in accordance with another exemplary embodiment of the present invention.

FIG. 4 is a graph that illustrates the $CO_2$ uptake result, in accordance with another exemplary embodiment of the present invention. The values ranged from 3.7 to 17.5% according to the cement (OPC) mass. Increasing the initial air curing duration from 0 to 4 hours (0a-4c and 4a-4c) increased the $CO_2$ uptake by 78, 47, and 39% for mixes made with 0, 5, and 10% CCR, respectively. Similarly, the $CO_2$ uptake is 165, 94, and 75% higher when the initial air curing duration increased from 0 to 20 hours (0a-4c and 20a-4c) for the same respective CCR replacement percentages.

In accordance with an embodiment of the present invention, the above data shows that prolonging the duration of initial air curing improved the degree of the accelerated carbonation curing. Such an increase in $CO_2$ absorption is owed to the loss of free water during the initial air curing period, which allows for the penetration of $CO_2$ deeper into the concrete. Nevertheless, using higher CCR replacement percentages decreased the rate of improvement. Apparently, initial air curing is less effective when more CCR is incorporated into the mix, as the carbonation efficiency of the carbonated CCR-OPC blended concrete seemed to be less sensitive to its water content.

Furthermore, for these mixes, the optimum CCR replacement for maximum carbon sequestration potential (i.e., highest $CO_2$ uptake) is 5%, by the cement (OPC) mass. Indeed, mix 20a-4c-5CCR takes an uptake of 10.3%, by cement mass. Similarly, extending the initial air curing duration from 0 to 20 hours (0a-20c and 20a-20c) increased the $CO_2$ uptake by 209, 162, and 169% for mixes having 0, 5, and 10% CCR replacement, respectively. Among the concrete mixes, 20a-20c-10CCR has the highest uptake of 17.5%, by cement mass. This shows that prolonged the air and the accelerated carbonation curing maximize the degree of the accelerated carbonation curing of the concrete with up to 10% CCR. The effect of extending the carbonation duration on the $CO_2$ uptake is examined by comparing groups 20a-4c and 20a-20c.

In accordance with an embodiment of the present invention, all the results show that increasing the carbonation duration from 4 to 20 hours increased the $CO_2$ uptake by 48, 52, and 97% for mixes incorporating 0, 5, and 10% CCR, by cement mass, respectively. The improvement is due to more prolonged exposure of calcium-carrying compounds to $CO_2$ gas, allowing more time for such compounds to react. On the other hand, replacing cement with CCR enhanced the degree of reaction, possibly owing to the more sensitive nature of the CCR to carbonation than cement.

The findings indicated that the replacement of cement by CCR has an impact on $CO_2$ uptake. Yet, the optimum quantity of CCR for maximum $CO_2$ absorption varied depending on the accelerated carbonation curing. In fact, 5 and 10% CCR replacement rates are found to be optimal for concrete mixes that are carbonated for 4 and 20 hours, respectively, regardless of the initial air curing duration (i.e., 0, 4, or 20 hours). It seems that a longer carbonation curing duration of 20 hours is needed when more CCR is incorporated into the concrete mix. Nevertheless, increasing the CCR replacement to 20% (0a-20c-20CCR and 20a-20c-20CCR) led to a decrease in $CO_2$ absorption.

Figure 5:
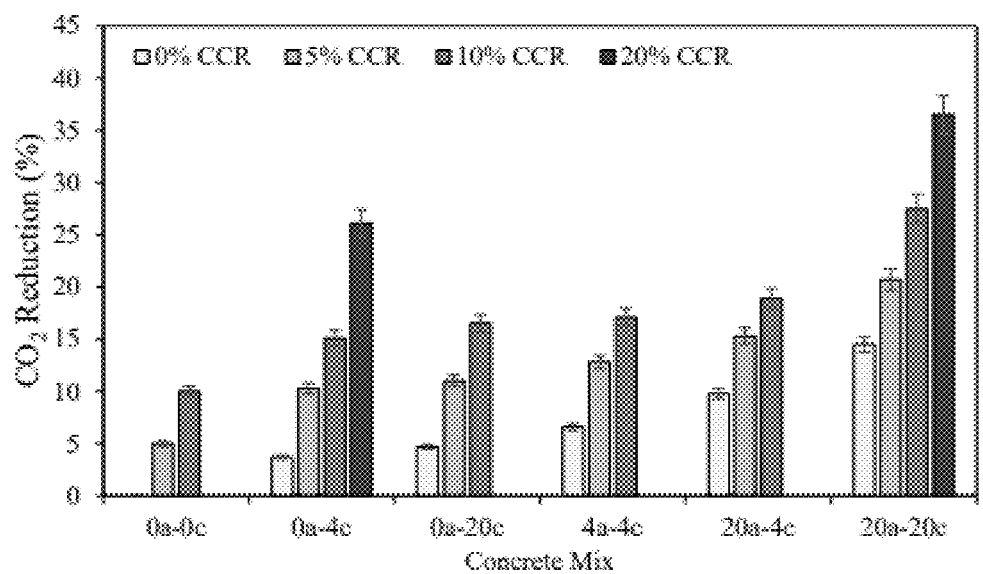
FIG. 5 is a graph that illustrates a total $CO_2$ reduction of CCR-OPC blended concrete mixes, in accordance with another exemplary embodiment of the present invention.

FIG. 5 is a graph that illustrates a total $CO_2$ reduction of the CCR-OPC blended concrete mixes, in accordance with another exemplary embodiment of the present invention. The total $CO_2$ reduction is the summation of the $CO_2$ reduction due to OPC replacement by CCR and the $CO_2$ uptake due to the accelerated carbonation curing of the fresh or semi-hardened CCR-OPC blended concrete. For each 1 kg of cement replaced, the carbon footprint is reduced by 0.95 kg. As such, the total $CO_2$ reduction for each mix is calculated and presented in FIG. 5. Results show that without the accelerated carbonation curing, the decrease in the carbon footprint of concrete could reach 10%, which is owed to the replacement of OPC with 10% CCR, by mass.

Meanwhile, the fresh or semi-hardened CCR-OPC blended concrete mixes treated with the accelerated carbonation curing regime within a 24-hour timeframe (0a-4c, 0a-20c, 4a-4c, and 20a-4c) have up to 26% lower carbon footprint than the hydrated control mix (0a-0c-0CCR). Extending the accelerated carbonation curing beyond 24 hours allowed for higher $CO_2$ reductions. In fact, the highest $CO_2$ reduction of 36.5% is associated with the mix having 20% CCR replacement and being subjected to 20 hours of initial air curing followed by 20 hours of the accelerated carbonation curing (20a-20c-20CCR). Although the increase in CCR replacement percentage from 10 to 20% reduced the $CO_2$ absorption from 17.5 to 16.5%, respectively, the overall carbon savings increased from 27.5 to 36.5%. This shows that the accelerated carbonation curing of the fresh or semi-hardened CCR-OPC blended concrete mixes has the potential to alleviate the environmental footprint of the construction industry.

Figure 6:
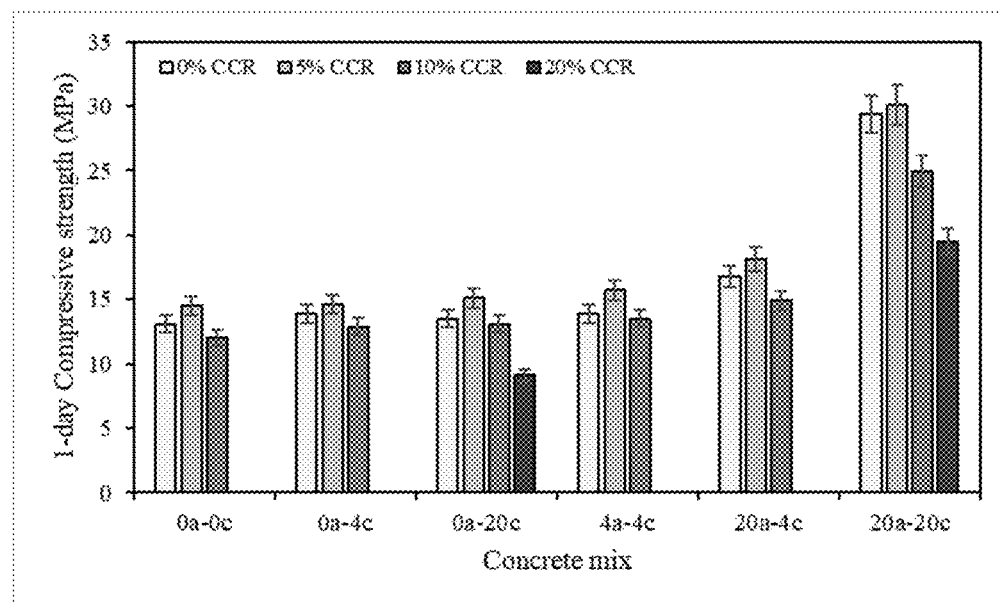
FIG. 6 is a graph that illustrates the 1-day compressive strength of CCR-OPC blended concrete mixes, in accordance with another exemplary embodiment of the present invention.

FIG. 6 is a graph that illustrates the 1-day compressive strength of CCR-OPC blended concrete mixes, in accordance with another exemplary embodiment of the present invention. For the hydrated control mix (0a-0c-0CCR), the 1-day compressive strength is 13.1 MPa. After replacing 5 and 10% cement (OPC) with the CCR, the strength is 21.1 and 9.8 MPa, respectively. This shows that 5% CCR replacement in hydrated concrete improved its early-age mechanical strength.

In accordance with an embodiment of the present invention, the higher replacement rates are detrimental to such characteristics. Compared to the control mix (0a-0c-0CCR), the CCR-OPC blended concrete are carbonated for 4 hours after 0 and 4 hours of initial air curing (0a-4c and 4a-4c) suffered a loss in strength, possibly due to the evaporation of water during initial air curing which is needed for hydration. Conversely, the concrete mixes with longer initial air curing (20a-4c) or prolonged carbonation curing (0a-20c) have superior 1-day compressive strengths. Apparently, such conditions promoted the formation of carbonation and hydration products and increased the 1-day strength.

Yet, this performance enhancement is valid for up to 10% CCR replacement only, the higher CCR replacement of 20% experienced a decrease in 1-day strength.

Figure 7:
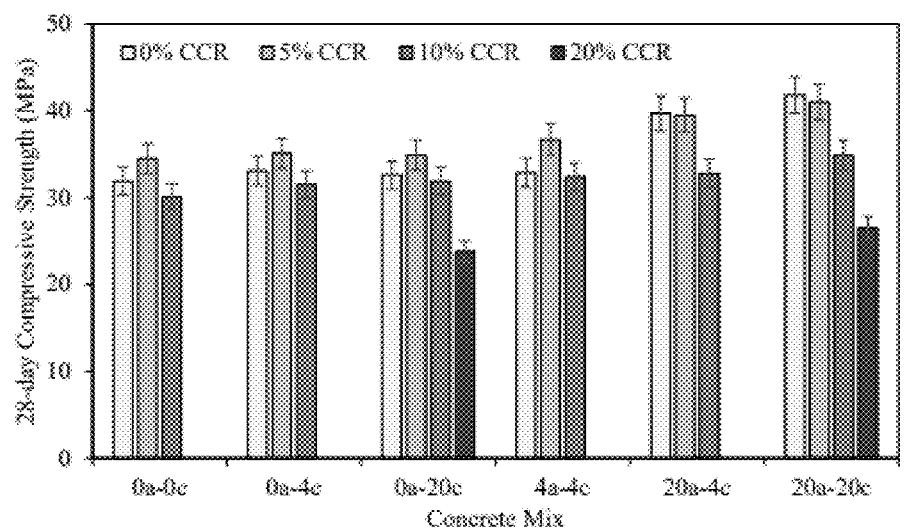
FIG. 7 is a graph that illustrates the 28-day compressive strength of CCR-OPC blended concrete mixes, in accordance with another exemplary embodiment of the present invention.

FIG. 7 is a graph that illustrates the 28-day compressive strength of CCR-OPC blended concrete mixes, in accordance with another exemplary embodiment of the present invention. For the 28-day compressive strengths, the carbonated samples incorporating CCR have either equivalent or superior strength to the control mix (0a-0c-0CCR), except in mixes containing 20% CCR, where the strength decreased by up to 25%. Nevertheless, all concrete mixes could be utilized in the production of non-load-bearing concrete masonry units.

In accordance with an embodiment of the present invention, the effect of the initial air curing on the 1-day compressive strength of 4-hour carbonated CCR concrete is assessed (0a-4c, 4a-4c, and 20a-4c). Increasing the initial air curing duration from 0 to 4 and 20 hours led to respective increases in the 1-day strength of concrete made without CCR by 21 and 89%. Meanwhile, mixes having 5 and 10% CCR replacement noted increases of up to 91 and 42%, respectively. This shows that the positive effect of initial air curing on strength decreased with higher CCR replacement. Similarly, at 28 days, the compressive strength is increased as the extended initial air curing duration. With 20 hours of the initial air curing, 4-hour carbonated CCR concrete mixes made with 0, 5, and 10% CCR had 20, 13, and 4% higher 28-day compressive strength than those without air curing (0a-4c). Like the $CO_2$ uptake, prolonged initial air curing has a less prominent effect on the compressive strength of concrete mixes with higher CCR replacement.

The impact of prolonging the exposure of the CCR-OPC blended concrete to $CO_2$ gas (i.e., longer carbonation durations) on the compressive strength is examined. Comparing groups 0a-4c and 0a-20c shows that extending the carbonation curing duration from 4 to 20 hours increased the 1-day compressive strength of mixes made with 0, 5, and 10% CCR by 63, 54, and 5%, respectively. This shows that prolonging carbonation curing is used to improve the compressive strength, albeit higher CCR replacement rates reduced the degree of enhancement. Such a finding is more pronounced at 28 days, where mixes have nearly equivalent 28-day compressive strength regardless of the duration of carbonation or CCR replacement percentage (except for 20% CCR replacement).

Similar trends at 28 days were noted when comparing 20a-4c and 20a-20c mixes. In conclusion, the highest strengths are obtained upon replacement cement with 5% CCR. Yet, to maximize cement replacement in the concrete (i.e., reduce its carbon footprint) while maintaining or improving the 28-day compressive strength, the optimum CCR replacement percentage was 10%, by cement mass. Nevertheless, using a higher CCR replacement of 20% (to maximize the $CO_2$ reduction) may still attain 28-day compressive strengths exceeding 20 MPa, which is sufficient for producing concrete blocks and bricks.

Figure 8:
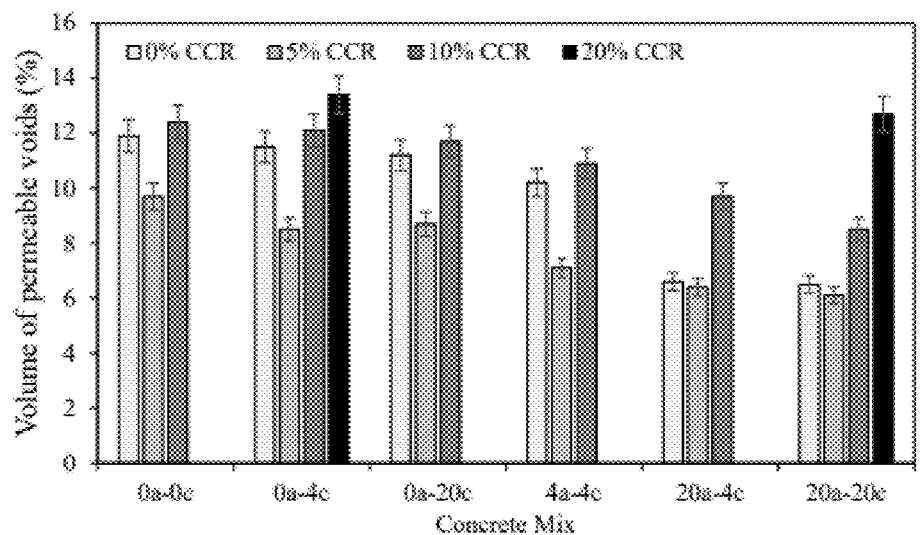
FIG. 8 is a graph that illustrates the volume of permeable voids of CCR-OPC blended concrete mixes measured at an age of 28 days, in accordance with another exemplary embodiment of the present invention.

FIG. 8 is a graph that illustrates the volume of permeable voids of CCR-OPC blended concrete mixes measured at an age of 28 days, in accordance with another exemplary embodiment of the present invention. The volume of permeable voids of the control group (0a-0c) made of 0, 5, and 10% CCR are 11.9, 9.7, and 12.4%, respectively. Similar to the 28-day compressive strength trend, replacing cement by 5% CCR improved the durability of the carbonated CCR-OPC blended concrete by reducing the voids in the mix. Meanwhile, increasing the CCR replacement to 10% has an insignificant effect. Results also showed that the accelerated carbonation curing either maintained or reduced the volume of permeable voids, except in the cases of mixes with 20% CCR (0a-4c-20CCR and 20a-20c-20CCR), where it increased. Evidently, an increase in CCR replacement led to an increase in the volume of permeable voids, which is aligned with the decrease in compressive strength.

FIG. 8 also shows that extending initial air curing from 0 to 4 and 20 hours prior to 4-hour carbonation decreased the volume of permeable voids of mixes without CCR by 11 and 46%, respectively. With CCR replacement of 5 and 10%, the voids decreased by up to 25 and 20%, respectively. This indicates that initial air curing has a positive impact on durability while noting that such enhancement diminishes as more cement is replaced by CCR. Such a finding is analogous to those of $CO_2$ uptake and compressive strength. A similar trend is also noticed when comparing mixes 0a-20c and 20a-20c.

As for the accelerated carbonation curing duration, prolonging the exposure of fresh concrete from 4 to 20 hours (0a-4c and 0a-20c) has an insignificant effect on the volume of permeable voids. Meanwhile, for mixes that are initially air cured for 20 hours, increasing the carbonation duration from 4 to 20 hours (20a-4c and 20a-20c) decreased the volume of permeable voids of mixes incorporating 0, 5, and 10% CCR by 11, 5, and 12%, respectively. Such a finding aligns with the increase in $CO_2$ absorption and 28-day compressive strength. The volume of permeable voids is affected by the cement replacement with the CCR. Regardless of the durations of air and carbonation curing, the optimum quantity of the CCR for the lowest volume of permeable voids is 5%, by cement mass. This is in line with these mixes having the highest 28-day compressive strength. It seems that higher CCR replacement retarded the void-filling capabilities of the carbonated CCR-OPC blended concrete, thereby increasing the volume of permeable voids and decreasing the compressive strength.

Figure 9:
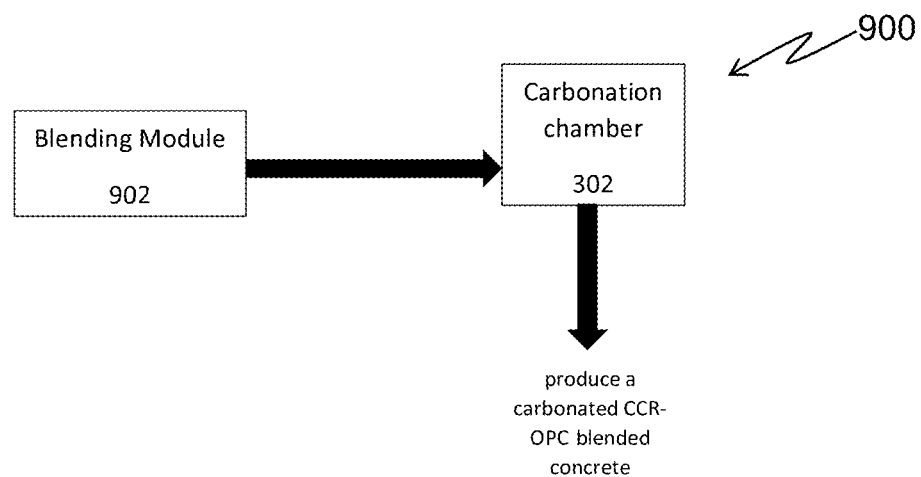
FIG. 9 provides a schematic representation of a system for a concrete production, in accordance with an embodiment of the present invention.

FIG. 9 provides a schematic representation of a system 900 for a concrete production, in accordance with an embodiment of the present invention. The system 900 includes a blending module 902, and a carbonation chamber 302 (Refer to FIG. 3). The blending module 902 mixes a calcium carbide residue (CCR) and an ordinary Portland cement (OPC) to produce a CCR-OPC blended concrete. The carbonation chamber 302 (Refer to FIG. 3) performs an accelerated carbonation curing of the CCR-OPC blended concrete in its fresh or semi-hardened state. Further, the carbonation chamber 302 (Refer to FIG. 3) produces a carbonated CCR-OPC blended concrete after the accelerated carbonation curing.

In accordance with an embodiment of the present invention, the CCR-OPC blended concrete is exposed to a carbon dioxide ($CO_2$) gas to promote a plurality of properties of the carbonated CCR-OPC blended concrete. Further, the plurality of properties of the carbonated CCR-OPC blended concrete is a rapid strength gain, an enhanced durability, and a permanent sequester of the carbon dioxide gas.

In accordance with an embodiment of the present invention, the CCR is an industrial waste by product and is mainly composed of a calcium hydroxide $Ca(OH)_2$. In accordance with an embodiment of the present invention, the ordinary Portland cement (OPC) is replaced by up to 20% of the calcium carbide residue, by mass. Further, the carbonated CCR-OPC blended concrete is obtained by mixing of a cementitious binder, an aggregate, and water. Further, the calcium carbide residue incorporation reduced an overall carbon footprint of the carbonated CCR-OPC blended concrete. In accordance with an embodiment of the present invention, the accelerated carbonation curing of the CCR-OPC blended concrete is affected by a quantity of the CCR, an initial air curing duration, and an accelerated carbonation curing duration.

In accordance with an embodiment of the present invention, the incorporation of the CCR and the accelerated carbonation curing affect the performance of the carbonated CCR-OPC blended concrete that is evaluated through a $CO_2$ uptake, a compressive strength, and a volume of permeable voids.

In accordance with an embodiment of the present invention, the $CO_2$ uptake is increased by extending the accelerated carbonation curing duration and prolonging the initial air curing duration of the CCR-OPC blended concrete.

In accordance with an embodiment of the present invention, the compressive strength and the volume of permeable voids of the carbonated CCR-OPC blended concrete are enhanced by replacing the OPC with the CCR, prolonging the accelerated carbonation curing duration, and increasing the initial air curing duration. In accordance with the present invention, concrete incorporating CCR may be used in construction applications to alleviate $CO_2$ emissions associated with the industry. Concrete incorporating CCR can mitigate the adverse impact of $CO_2$ emissions on the environment and incorporating CCR in concrete increases the efficiency of the carbonation reaction of concrete. Carbonation-cured concrete incorporating CCR has superior or equivalent mechanical and durability properties to hydrated counterparts and the total reduction in the carbon footprint of concrete increased due to the incorporation of CCR and carbonation curing of CCR-OPC blended concrete.

In accordance with an advantageous embodiment of the present invention, the CCR is incorporated in the CCR-OPC blended concrete to enhance the carbon sequestration potential of the carbonated CCR-OPC blended concrete, as the CCR is rich in the calcium hydroxide $Ca(OH)_2$ so it is positively impacted the performance of the concrete. Accordingly, the invention promotes the concept of carbon capture, utilization, and storage (CCUS), decarbonizes the carbonated CCR-OPC blended concrete, and improves its mechanical and durability properties. In accordance with another advantageous embodiment of the present invention, the novel utilization of the CCR in the carbonated CCR-OPC blended concrete is a more sustainable and eco-friendly concrete.

In accordance with another advantageous embodiment of the present invention, the CCR is incorporated in the CCR-OPC blended concrete and is used in many construction applications to alleviate $CO_2$ emissions associated with the industry. It easily mitigates the adverse impact of $CO_2$ emissions on the environment. Further, it increases the efficiency of the carbonation reaction of the CCR-OPC blended concrete. The total reduction in the carbon footprint of the carbonated CCR-OPC blended concrete is increased due to the incorporation of CCR and the accelerated carbonation curing of the CCR-OPC blended concrete.

In accordance with another advantageous embodiment of the present invention, this invention may be used in many real-time applications that is anyone of a cement factory, concrete masonry block producer, and precast concrete plants. This invention helps in developing a market for carbon capture, utilization, and storage. The construction industry may be a beneficiary of a final product (the carbonated CCR-OPC blended concrete) of this invention. This invention may be adopted by various $CO_2$-generating industries for direct and indirect $CO_2$ capture to reduce their carbon footprint.

In accordance with an alternative embodiment of the present invention, the CCR content replacement may increase above 20% of the cement (OPC) mass. Using higher amounts of CCR may require modifying the mix design or adding supplementary cementitious materials (SCMs) to the concrete mix to provide good results. Changing the mix design may cause a variation in the porosity of the carbonated CCR-OPC blended concrete, which influences the diffusivity of the $CO_2$ gas, hence increasing the $CO_2$ uptake. Since the initial air curing and the carbonation durations are in the ranges of 0-20 hours and 4-20 hours, respectively, longer duration (i.e., beyond 40 hours) may yield better results. Since in the present invention the carbonation curing pressure is set to 1 bar, increasing or lowering the pressures may yield different results.

In accordance with the present invention, the usage of CCR in concrete as a blend/CCR as a partial replacement of OPC in concrete and exposing CCR-OPC blended concrete to accelerated carbonation for the storage of $CO_2$, and the specific accelerated carbonation method includes incorporating solid CCR (i.e., powder form) in concrete as a cement replacement and exposing fresh or semi-hardened CCR-OPC blended concrete to $CO_2$ gas in a carbonation chamber—the final product being carbonated CCR-OPC blended concrete. The primary aspects of the present invention include novel utilization of CCR in concrete which is exposed to accelerated carbonation curing. Carbonated concrete incorporating CCR being a more sustainable and eco-friendly concrete than counterparts made without CCR, concrete incorporating CCR having a higher $CO_2$ uptake in comparison to concrete made without CCR, concrete incorporating CCR having enhanced mechanical properties than concrete made without CCR, and concrete incorporating CCR having superior durability performance in comparison with mixes made without CCR. The developed carbonation-cured CCR-OPC blended concrete may be used in precast construction applications to mitigate the adverse environmental impact of carbon emissions attributed to cement production while recycling calcium carbide residue and meeting construction performance requirements.

It should be noted that the invention has been described with reference to particular embodiments and that the invention is not limited to the embodiments described herein.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The invention claimed is:

1. A method for a concrete production, comprising:
   mixing of a calcium carbide residue (CCR) and ordinary Portland cement (OPC) to produce CCR-OPC blended concrete;
   incorporating the CCR-OPC blended concrete in its fresh or semi-hardened state to a carbonation chamber for accelerated carbonation curing of the semi-hardened CCR-OPC blended concrete; and
   producing carbonated CCR-OPC blended concrete after the accelerated carbonation curing.

2. The method of claim 1, wherein the CCR-OPC blended concrete is exposed in its fresh or semi-hardened state to carbon dioxide ($CO_2$) gas to enhance a plurality of properties of the carbonated CCR-OPC blended concrete.

3. The method of claim 2, wherein the plurality of properties of the carbonated CCR-OPC blended concrete comprises strength gain, durability, and a permanent sequester of the carbon dioxide gas.

4. The method of claim 1, wherein the CCR is an industrial by-product and is composed of calcium hydroxide $Ca(OH)_2$.

5. The method of claim 1, wherein the ordinary Portland cement is replaced by up to 20% of the calcium carbide residue, by mass.

6. The method of claim 1, wherein the carbonated CCR-OPC blended concrete is obtained by mixing of a cementitious binder, an aggregate and water.

7. The method of claim 1, wherein the calcium carbide residue incorporation reduces overall carbon footprint of the carbonated CCR-OPC blended concrete.

8. The method of claim 1, wherein the accelerated carbonation curing of the CCR-OPC blended concrete depends on a quantity of the CCR, initial air curing duration, and accelerated carbonation curing duration.

9. The method of claim 1, wherein incorporation of the CCR and the accelerated carbonation curing affects performance of the carbonated CCR-OPC blended concrete which is evaluated through $CO_2$ uptake, compressive strength, and volume of permeable voids.

10. The method of claim 9, wherein the $CO_2$ uptake is increased by extending the accelerated carbonation curing duration.

11. The method of claim 9, wherein the $CO_2$ uptake is increased by prolonging the initial air curing duration of the semi-hardened CCR-OPC blended concrete.

12. The method of claim 1, wherein the CCR is in solid powder form is incorporated as a partial replacement of the OPC.

13. A system for concrete production, comprising:
   a blending module for mixing of calcium carbide residue (CCR) and ordinary Portland cement (OPC) to produce a CCR-OPC blended concrete; and
   a carbonation chamber for performing accelerated carbonation curing of the CCR-OPC blended concrete in its fresh or semi-hardened state, thereby resulting in carbonated CCR-OPC blended concrete.

14. The system of claim 13, wherein the CCR-OPC blended concrete is exposed in its fresh or semi-hardened state to carbon dioxide ($CO_2$) gas to enhance a plurality of properties of the carbonated CCR-OPC blended concrete.

15. The system of claim 13, wherein the plurality of properties of the carbonated CCR-OPC blended concrete comprise strength gain, durability, and a permanent sequester of the carbon dioxide gas.

16. The system of claim 13, wherein the CCR is an industrial waste by-product and is composed of calcium hydroxide $Ca(OH)_2$.

17. The system of claim 13, wherein the CCR in solid powder form is incorporated as a partial replacement of the OPC.

* * * * *